United States Patent
Yamanaka et al.

(10) Patent No.: US 12,057,127 B2
(45) Date of Patent: Aug. 6, 2024

(54) MICROPHONE UNIT

(71) Applicant: HOSIDEN CORPORATION, Osaka (JP)

(72) Inventors: Yoshifumi Yamanaka, Osaka (JP); Shogo Kubota, Osaka (JP)

(73) Assignee: HOSIDEN CORPORATION, Osaka (JP)

( * ) Notice: Subject to any disclaimer, the term of this patent is extended or adjusted under 35 U.S.C. 154(b) by 424 days.

(21) Appl. No.: 17/626,982

(22) PCT Filed: Jun. 9, 2020

(86) PCT No.: PCT/JP2020/022616
§ 371 (c)(1),
(2) Date: Jan. 13, 2022

(87) PCT Pub. No.: WO2021/010056
PCT Pub. Date: Jan. 21, 2021

(65) Prior Publication Data
US 2022/0415330 A1    Dec. 29, 2022

(30) Foreign Application Priority Data
Jul. 17, 2019 (JP) ................. 2019-131930

(51) Int. Cl.
*G10L 17/00* (2013.01)
*G10L 15/02* (2006.01)
(Continued)

(52) U.S. Cl.
CPC .............. *G10L 17/02* (2013.01); *G10L 15/02* (2013.01); *G10L 15/28* (2013.01); *H04R 19/04* (2013.01); *H04R 2201/003* (2013.01)

(58) Field of Classification Search
CPC ......... G10L 17/04; G10L 17/00; G10L 17/20; G10L 2015/223; G10L 15/18;
(Continued)

(56) References Cited

U.S. PATENT DOCUMENTS

| 4,907,274 A | 3/1990 | Nomura et al. |
| 10,332,517 B1 * | 6/2019 | Wang ................. G06F 21/6245 |

(Continued)

FOREIGN PATENT DOCUMENTS

| JP | 63-223965 A | 9/1988 |
| JP | 2005-241215 A | 9/2005 |

(Continued)

OTHER PUBLICATIONS

Quatieri et al., "Estimation of Handset Nonlinearity with Application to Speaker Recognition," IEEE Transactions on Speech and Audio Processing, 8(5), Sep. 1, 2000, pp. 567-584.

*Primary Examiner* — Jakieda R Jackson
(74) *Attorney, Agent, or Firm* — Dilworth & Barrese, LLP

(57) ABSTRACT

A microphone unit includes: an audio data acquisition unit that acquires speech as audio data; an audio data registration unit that registers verification audio data obtained by extracting a feature point from the audio data; an evaluation audio data acquisition unit that acquires speech that is input to a first microphone as evaluation audio data; a verification unit that verifies whether or not a speaker who uttered speech that is based on the evaluation audio data is a speaker who uttered speech that is based on the verification audio data, based on the verification audio data and a feature point extracted from the evaluation audio data; and a verification result output unit that outputs a result of verification performed by the verification unit.

20 Claims, 3 Drawing Sheets

(51) Int. Cl.
*G10L 15/28* (2013.01)
*G10L 17/02* (2013.01)
*H04R 19/04* (2006.01)

(58) Field of Classification Search
CPC ......... G10L 17/02; G10L 15/02; G10L 15/22; G06F 21/32; G06F 2221/2111; G06F 3/167; H04L 63/0861; H04W 12/06; H04R 19/04; H04R 2201/003; G06Q 20/40145

See application file for complete search history.

(56) References Cited

U.S. PATENT DOCUMENTS

| | | | | |
|---|---|---|---|---|
| 10,593,328 | B1* | 3/2020 | Wang | H04L 65/1059 |
| 10,861,453 | B1* | 12/2020 | Chadha | G10L 15/1815 |
| 10,887,764 | B1* | 1/2021 | Mokady | H04W 4/14 |
| 11,004,454 | B1* | 5/2021 | Srinivasan | G10L 17/04 |
| 11,361,764 | B1* | 6/2022 | Zhao | G06F 40/30 |
| 2015/0245154 | A1* | 8/2015 | Dadu | G10L 19/0018 |
| | | | | 381/56 |
| 2015/0356974 | A1 | 12/2015 | Tani et al. | |
| 2015/0379989 | A1* | 12/2015 | Balasubramanian | G06Q 30/0257 |
| | | | | 704/233 |
| 2016/0019889 | A1 | 1/2016 | Alvarez Guevara et al. | |
| 2016/0275952 | A1* | 9/2016 | Kashtan | G10L 17/00 |
| 2017/0214002 | A1* | 7/2017 | Riedel | H10K 50/818 |
| 2017/0371620 | A1* | 12/2017 | Zhou | H04L 51/18 |
| 2018/0018973 | A1* | 1/2018 | Moreno | G10L 17/02 |
| 2018/0040323 | A1 | 2/2018 | Lesso et al. | |
| 2018/0232511 | A1* | 8/2018 | Bakish | G06F 21/32 |
| 2019/0027138 | A1* | 1/2019 | Wang | G10L 25/18 |
| 2019/0057703 | A1* | 2/2019 | Zeinstra | G10L 15/30 |
| 2019/0073999 | A1* | 3/2019 | Prémont | G10L 15/08 |
| 2020/0135190 | A1* | 4/2020 | Kaja | G06V 20/593 |
| 2020/0184966 | A1* | 6/2020 | Yavagal | G10L 15/30 |

FOREIGN PATENT DOCUMENTS

| | | |
|---|---|---|
| JP | 2006-3451 A | 1/2006 |
| JP | 2006-126558 A | 5/2006 |
| JP | 2018-45190 A | 3/2018 |
| RU | 2230375 C2 | 6/2004 |
| WO | 2014/112375 A1 | 7/2014 |

* cited by examiner

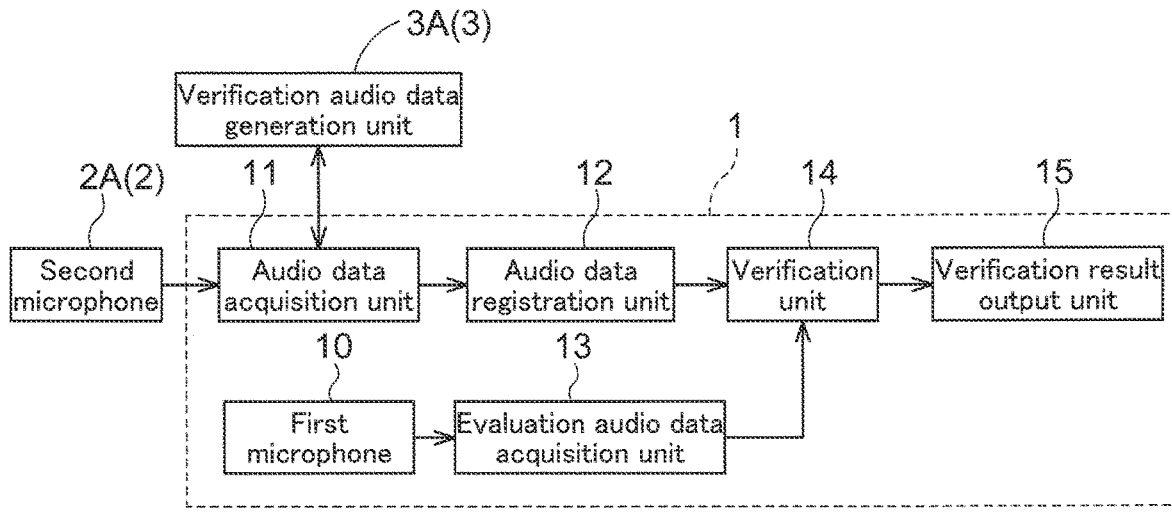
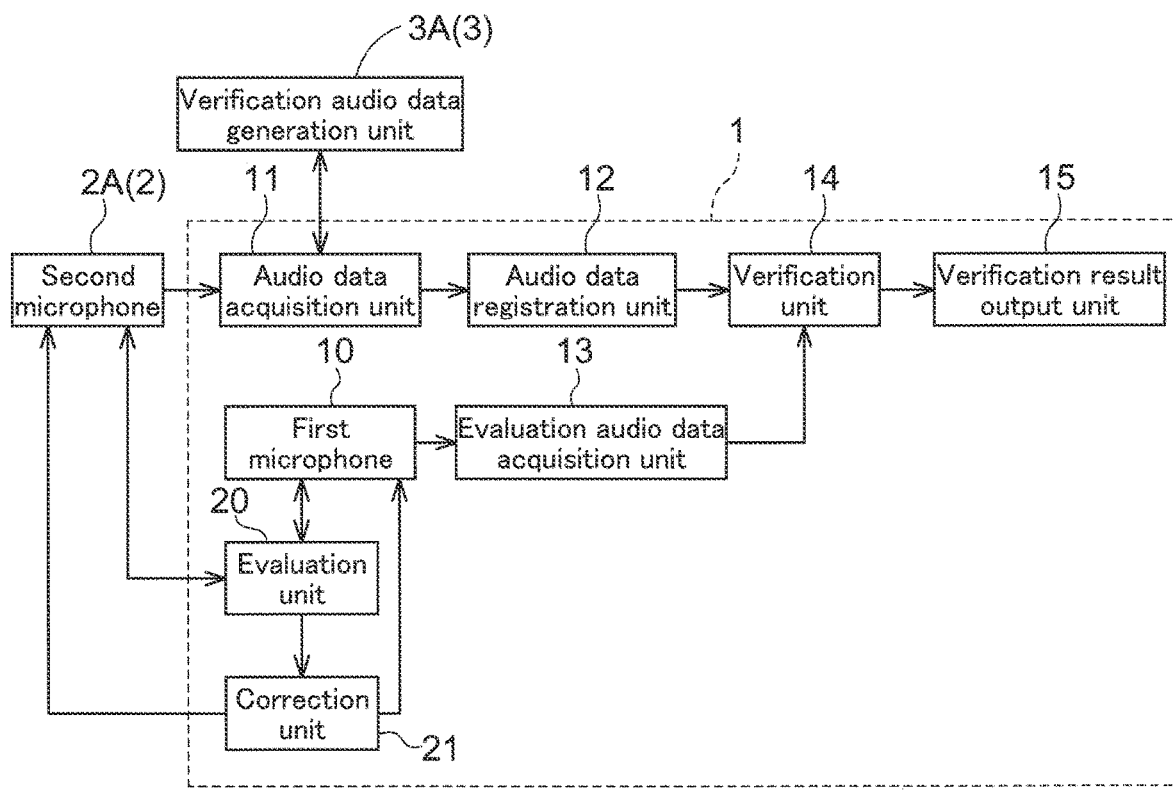

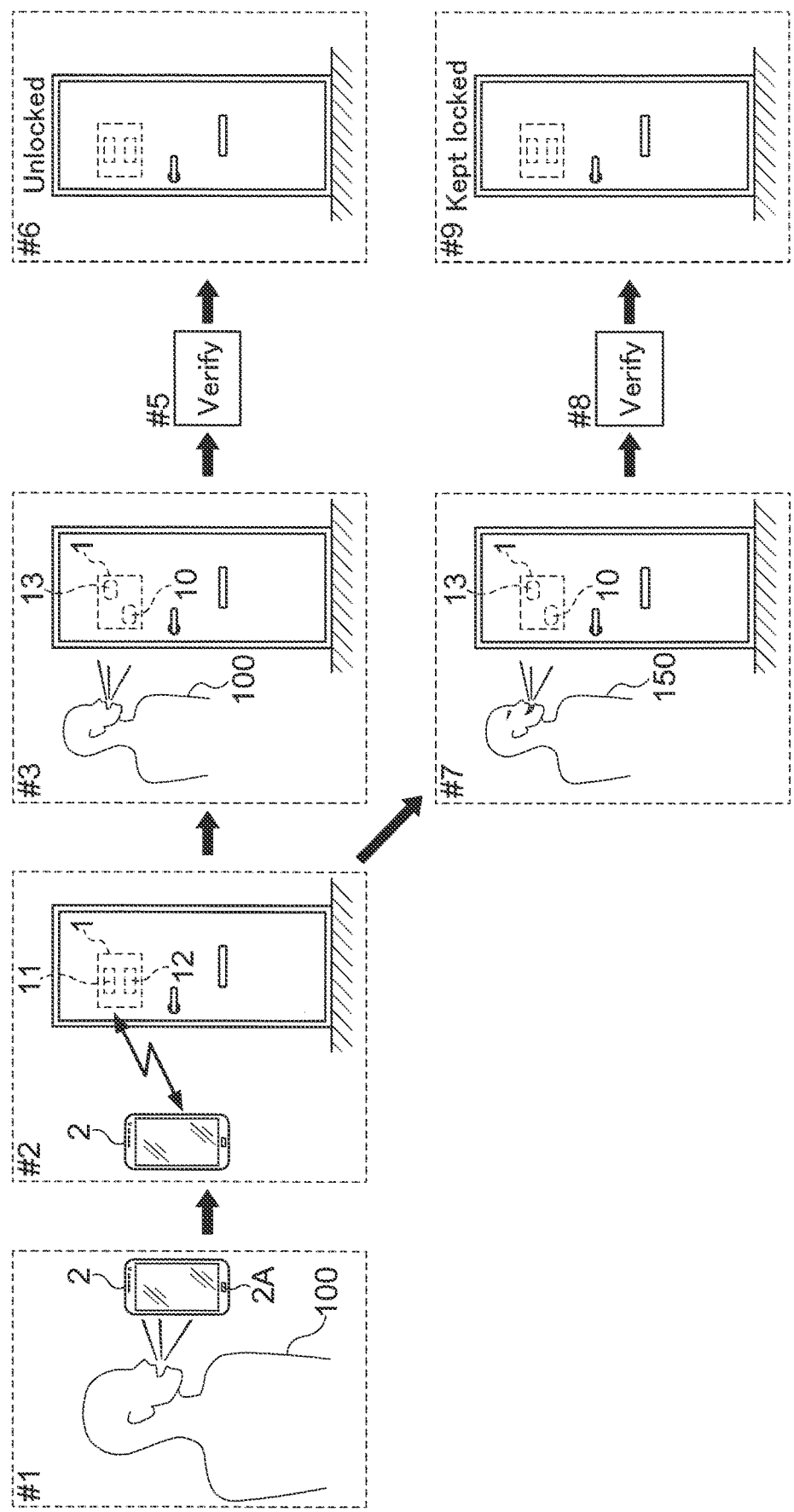

MICROPHONE UNIT

TECHNICAL FIELD

The present invention relates to a microphone unit that is capable of determining whether or not speech that is input to a first microphone is speech uttered by an expected speaker.

BACKGROUND ART

Technologies for giving instructions to, for example, electric appliances using speech are conventionally used. In such technologies, speech recognition is performed. An example of technologies relating to speech recognition is described in Patent Document 1 of which the source is shown below.

Patent Document 1 describes a speech interaction system. The speech interaction system is constituted by a speech interaction device and a speech recognition server. The speech interaction device recognizes speech that is input to a speech input means, and transmits the speech input to the speech input means to the speech recognition server. The speech recognition server recognizes the speech received from the speech interaction device. The speech interaction device is configured to output a response that is based on a recognition result obtained by the speech interaction device, and thereafter output a response that is based on a difference between the recognition result obtained by the speech interaction device and a recognition result obtained by the speech recognition server.

PRIOR ART DOCUMENTS

Patent Documents

Patent Document 1: JP 2018-45190A

DISCLOSURE OF THE INVENTION

Problem to be Solved by the Invention

In the technology described in Patent Document 1, speech recognition processing is performed not only in the speech interaction device, but also in the speech recognition server. Accordingly, communication is required to perform the speech recognition, and the technology cannot be used under circumstances where communication infrastructure is not available. Also, the technology described in Patent Document 1 is for performing speech recognition, and identification of the speaker who uttered the speech is not envisaged.

Therefore, there is a need for a microphone unit that does not require a network to perform recognition processing and is capable of identifying the speaker who uttered the speech.

Means for Solving Problem

A characteristic configuration of a microphone unit according to the present invention is a microphone unit capable of determining whether or not speech that is input to a first microphone is speech uttered by an expected speaker, the microphone unit including: an audio data acquisition unit configured to acquire speech as audio data; an audio data registration unit configured to register verification audio data that is obtained by extracting a feature point from the audio data; an evaluation audio data acquisition unit configured to acquire speech that is input to the first microphone as evaluation audio data; a verification unit configured to verify whether or not a speaker who uttered speech that is based on the evaluation audio data is a speaker who uttered speech that is based on the verification audio data, based on the verification audio data and a feature point extracted from the evaluation audio data; and a verification result output unit configured to output a result of verification performed by the verification unit, wherein the verification audio data is generated by a device that is different from a device that includes the first microphone, and the verification audio data is transmitted using wireless communication between the device including the first microphone and the different device.

With this characteristic configuration, it is possible to perform the verification without providing a server for verification. That is, the verification is so-called local recognition processing, and therefore can be safely performed in terms of security. Also, the speaker who uttered speech that is registered in advance can be easily identified.

It is preferable that, when the verification unit is in a sleep state, the sleep state is ended upon the evaluation audio data being acquired by the evaluation audio data acquisition unit.

With this configuration, power consumption can be reduced.

It is preferable that the audio data acquired by the audio data acquisition unit is data regarding speech that is input to a second microphone provided in a device that is different from the device including the first microphone, and the microphone unit further includes: an evaluation unit configured to evaluate frequency characteristics of the first microphone and frequency characteristics of the second microphone before speech is input to both of the first microphone and the second microphone; and a correction unit configured to correct frequency characteristics of one of the first microphone and the second microphone so as to match frequency characteristics of the other of the first microphone and the second microphone.

In this configuration, the frequency characteristics of the first microphone match the frequency characteristics of the second microphone, and therefore, it is possible to increase the verification rate when speech is input to the first microphone and the second microphone by the same user.

It is preferable that the microphone unit further includes: a test audio data acquisition unit configured to acquire, as test audio data, speech uttered by a speaker who uttered speech relating to the verification audio data using the first microphone, after the verification audio data is registered and before the evaluation audio data is acquired; and a calculation unit configured to calculate a verification rate of the speaker that is based on the test audio data while changing a verification parameter that is used in the verification, based on the test audio data and the verification audio data, and the verification unit performs the verification based on the verification parameter that corresponds to the highest verification rate among verification rates calculated by the calculation unit.

Typically, when a false recognition rate is reduced, the verification rate also decreases, but there is a verification parameter that reduces only the false recognition rate but does not reduce the verification rate. Accordingly, by finding the verification parameter while calculating the verification rate as in this configuration, it is possible to set an appropriate verification parameter.

It is preferable that the verification parameter is an amplification factor with which at least one of the test audio data and the verification audio data is amplified.

With this configuration, it is possible to increase the verification rate by changing an input range of at least one of the first microphone and the second microphone, for example.

It is preferable that the microphone unit further includes a parameter changing unit configured to automatically change a parameter of the first microphone based on the verification parameter when speech that is based on the evaluation audio data is input to the first microphone.

With this configuration, an audio level of speech that is input from the first microphone can be automatically suppressed to such a level at which the verification rate improves. Therefore, the verification rate can be automatically improved. A configuration is also possible in which speech is recorded only for a certain period, and the audio level is automatically changed based on an average audio level for the period.

It is preferable that the microphone unit identifies a speaker who uttered the speech input to the first microphone, based on the result of verification performed by the verification unit.

With this configuration, it is possible to identify the speaker who uttered speech that is input to a microphone unit used by a plurality of users, and therefore, convenience can be improved.

It is preferable that the microphone unit infers spoken content of the speech input to the first microphone, and gives an operation instruction to the device including the first microphone, based on the inferred content.

With this configuration, it is possible to control operations of the device including the first microphone, based on the operation instruction. Accordingly, it is possible to control the operations of the device including the first microphone, without using hands, for example, and therefore, convenience can be improved.

BRIEF DESCRIPTION OF THE DRAWINGS

FIG. 1 is a diagram showing a configuration of a microphone unit according to a first embodiment.

FIG. 2 is a diagram showing a configuration of a microphone unit according to a second embodiment.

FIG. 4 is a diagram showing an application example of a microphone unit.

BEST MODE FOR CARRYING OUT THE INVENTION

1. First Embodiment

Figure 3:
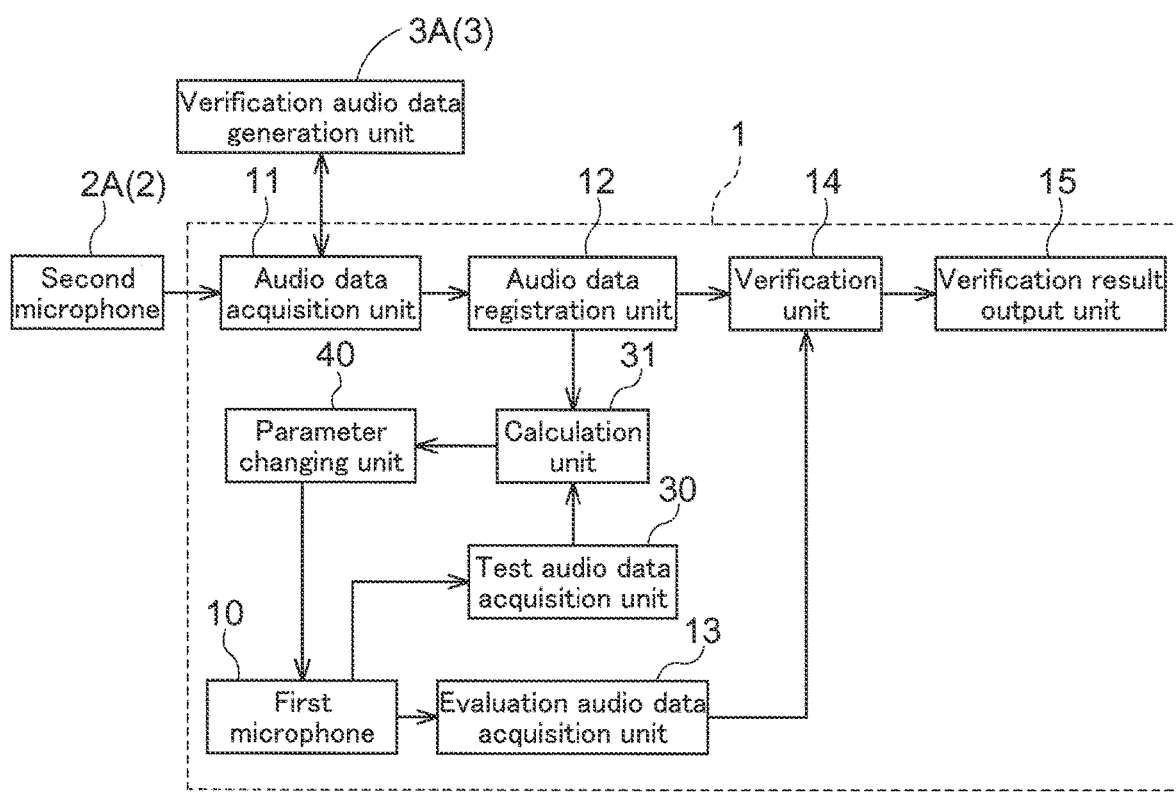
FIG. 3 is a diagram showing a configuration of a microphone unit according to a third embodiment.

A microphone unit according to the present invention is capable of determining whether or not speech that is input is speech uttered by an expected speaker. The following describes a microphone unit 1 according to the present embodiment.

FIG. 1 is a block diagram schematically showing a configuration of the microphone unit 1 according to the present embodiment. As shown in FIG. 1, the microphone unit 1 includes a first microphone 10, an audio data acquisition unit 11, an audio data registration unit 12, an evaluation audio data acquisition unit 13, a verification unit 14, and a verification result output unit 15 as functional units. These functional units are built using hardware and/or software, with a CPU serving as a core member, to perform processing related to the determination described above.

Speech is input to the first microphone 10. The first microphone 10 is a microphone element, but there is no particular limitation on the configuration of the first microphone 10. For example, the first microphone 10 can be constituted by at least one of an electret capacitor microphone (ECM), an analog MEMS (Micro-Electro-Mechanical System) microphone, a digital MEMS (Micro-Electro-Mechanical System) microphone, and the like. Speech that is input to the first microphone 10 is converted to audio data, which is an electrical signal, by the first microphone 10.

The audio data acquisition unit 11 acquires speech as audio data. In the present embodiment, the audio data acquired by the audio data acquisition unit 11 is data regarding speech that is input to a second microphone 2A provided in a device 2 that is different from a device that includes the first microphone 10. The device including the first microphone 10 is the microphone unit 1, in the present embodiment. Accordingly, the second microphone 2A is provided independently of (separately from) the microphone unit 1. Similarly to the first microphone 10, the second microphone 2A can also be constituted by at least one of an electret capacitor microphone (ECM), an analog MEMS (Micro-Electro-Mechanical System) microphone, a digital MEMS (Micro-Electro-Mechanical System) microphone, and the like. Speech that is input to the second microphone 2A is converted to audio data, which is an electrical signal, by the second microphone 2A. The audio data acquisition unit 11 acquires audio data that is converted and generated by the second microphone 2A.

The audio data registration unit 12 registers verification audio data that is obtained by extracting feature points from the audio data generated by the second microphone 2A. The audio data generated by the second microphone 2A is generated by converting the speech that was input to the second microphone 2A (to data) as described above. The feature points are features of an electrical signal (audio data) and correspond to a period, a peak value, a half-width, and the like, for example. Accordingly, verification audio data corresponds to data that is obtained by extracting features of an electrical signal generated by converting speech that was input to the second microphone 2A. Such verification audio data serves as master audio data that is used by the microphone unit 1 to realize a function of determining whether or not speech that is input to the first microphone 10 is speech uttered by an expected speaker, and is recorded in the audio data registration unit 12.

The verification audio data is generated by a device that is different from the device (microphone unit 1) including the first microphone 10. The device different from the device including the first microphone 10 is a device that is different from the microphone unit 1. Specifically, the different device corresponds to the device 2 that includes the second microphone 2A or a device 3 other than the microphone unit 1 and the device 2. In the present embodiment, the verification audio data is generated by a verification audio data generation unit 3A that is provided in the device 3. The verification audio data is transmitted using wireless communication between the device including the first microphone 10 and the different device. Wireless communication refers to LAN communication such as Wi-Fi (registered trademark) or short-range wireless communication such as Bluetooth (registered trademark), for example. Accordingly, in the present embodiment, the verification audio data is transmitted from the device 3 (the verification audio data generation unit 3A of the device 3) to the microphone unit 1 using such wireless communication. In a case where the verification audio data is generated in the device 2 including the second microphone 2A, the device 2 can be configured to include the verification audio data generation unit 3A.

In the case where the device 3 other than the microphone unit 1 and the device 2 generates the verification audio data, it is possible to adopt a configuration in which the audio data acquisition unit 11 transmits audio data to the device 3 other than the microphone unit 1 and the device 2 by using wireless communication, and the audio data registration unit 12 acquires the verification audio data generated by the device 3 other than the microphone unit 1 and the device 2, by using wireless communication.

Also, in the case where the device 2 generates the verification audio data, it is possible to adopt a configuration in which the audio data acquisition unit 11 transmits audio data to the device 2 by using wireless communication and the audio data registration unit 12 acquires the verification audio data generated by the device 2, by using wireless communication, or a configuration in which the audio data acquisition unit 11 is included in the device 2 and the audio data registration unit 12 acquires the verification audio data that is generated in the device 2 based on audio data acquired by the audio data acquisition unit 11, by using wireless communication.

In a well-known device such as a so-called smart speaker, for example, speech that is input to a microphone is digitized, and the digitized audio data is transmitted to an external device (server) via an Internet line. On the other hand, in the microphone unit 1 according to the present embodiment, the verification audio data generated by the verification audio data generation unit 3A by extracting feature points from audio data is transmitted to a paired device using wireless communication as described above.

The evaluation audio data acquisition unit 13 acquires speech that is input to the first microphone 10 as evaluation audio data. As described above, speech that is input to the first microphone 10 is converted to audio data, which is an electrical signal, by the first microphone 10. This audio data corresponds to the evaluation audio data. Accordingly, the evaluation audio data acquisition unit 13 acquires evaluation audio data that is generated by the first microphone 10 converting speech input to the first microphone 10 to audio data, which is an electrical signal.

The verification unit 14 verifies whether or not the speaker who uttered speech that is based on the evaluation audio data is the speaker who uttered speech that is based on the verification audio data, based on the verification audio data and feature points that are extracted from the evaluation audio data. The verification audio data is registered and recorded in the audio data registration unit 12. The evaluation audio data is acquired by the evaluation audio data acquisition unit 13. The feature points extracted from the evaluation audio data are features of the evaluation audio data, which is an electrical signal, and correspond to a period, a peak value, a half-width, and the like, for example. Similarly to the verification audio data, such feature points can be generated by a device that is different from the microphone unit 1 and can be transmitted using wireless communication. Naturally, a configuration is also possible in which the verification unit 14 extracts the feature points. The speech that is based on the evaluation audio data is speech that is input to the first microphone 10 and is converted by the first microphone 10 to the evaluation audio data. The speech that is based on the verification audio data is speech that is input to the second microphone 2A and is converted by the second microphone 2A to the verification audio data, in the present embodiment.

Accordingly, the verification unit 14 verifies whether or not the speaker who uttered speech that is input to the first microphone 10 and is converted by the first microphone 10 to the evaluation audio data is identical with the speaker who uttered speech that is input to the second microphone 2A and is converted by the second microphone 2A to the verification audio data, based on the verification audio data recorded in the audio data registration unit 12 and feature points extracted from the evaluation audio data acquired by the evaluation audio data acquisition unit 13.

Such verification can be performed based on a matching degree that is calculated by determining a ratio between matching points and different points that are extracted by comparing features (corresponding to the "feature points" described above) of the evaluation audio data and the verification audio data, for example. Specifically, a configuration is possible in which, when the matching degree is larger than a value that is set in advance, it is determined that the speaker who uttered speech converted to the evaluation audio data is identical with the speaker who uttered speech converted to the verification audio data, and when the matching degree is equal to or smaller than the value set in advance, it is determined that the speaker who uttered speech converted to the evaluation audio data is not identical with the speaker who uttered speech converted to the verification audio data. Of course, verification can be performed using a different method (e.g., known voiceprint analysis).

Here, the verification performed by the verification unit 14 involves computation processing, and therefore, if the verification unit 14 is constantly kept operating, power consumption increases. Therefore, the verification unit 14 is preferably caused to enter an operating state only when the verification is to be performed and enter a sleep state when no verification is performed. In such a case, when the verification unit 14 is in the sleep state, the sleep state can be ended upon evaluation audio data being acquired by the evaluation audio data acquisition unit 13, for example. In order to inform the verification unit 14 that evaluation audio data has been acquired by the evaluation audio data acquisition unit 13, information that indicates that the evaluation audio data has been acquired by the evaluation audio data acquisition unit 13 may be transmitted to the verification unit 14 or the evaluation audio data may be transmitted to the verification unit 14. It is also possible to inform the verification unit 14 by transmitting information indicating that voice has been detected by the first microphone 10 (Voice Active Detection) to the verification unit 14 via the evaluation audio data acquisition unit 13.

Thus, the verification unit 14 can be caused to enter the operating state only when verification is to be performed by the verification unit 14, and accordingly, power consumption can otherwise be reduced. This configuration can be realized by setting an operation frequency of the verification unit 14 in the sleep state to be lower than an operation frequency in the operating state. Furthermore, in order to realize operation frequencies different from each other, a clock (external clock) obtained from outside of the verification unit 14 can be used to operate the verification unit 14 in the sleep state, and a clock (internal clock) generated in the verification unit 14 can be used to operate the verification unit 14 in the operating state, for example.

Alternatively, instead of the above configuration, a configuration is also possible in which the verification unit 14 cancels the sleep state in response to a user operating a button (or a switch).

The verification result output unit 15 outputs a result of verification performed by the verification unit 14. The result of verification performed by the verification unit 14 is a result of determination as to whether or not the speaker who uttered speech converted to the evaluation audio data is identical with the speaker who uttered speech converted to the verification audio data. That is, the result of verification is a result of determination as to whether or not the speaker who uttered speech input to the first microphone 10 is identical with the speaker who uttered speech input to the second microphone 2A. The verification result output unit 15 may output the determination result to a display device, and the display device may display the determination result. Alternatively, the determination result may be output to a speaker device, and the speaker device may output a notification regarding the determination result. Furthermore, the determination result may be output to another control device and used for control by the other control device.

For example, it is possible to adopt a configuration in which the speaker who uttered speech input to the first microphone 10 is identified based on the result of verification performed by the verification unit 14. In such a case, an identification result of the speaker may be output by a speaker device or a display device. Furthermore, the identification result may be output to another control device and used for control by the other control device.

2. Second Embodiment

Next, a second embodiment will be described. The microphone unit 1 according to the second embodiment differs from the microphone unit 1 according to the first embodiment in that the microphone unit 1 according to the second embodiment further includes an evaluation unit 20 and a correction unit 21. Aspects other than the above aspect are the same as those in the first embodiment, and therefore, the following mainly describes differences.

FIG. 2 is a block diagram schematically showing a configuration of the microphone unit 1 according to the present embodiment. As shown in FIG. 2, the microphone unit 1 according to the present embodiment includes the first microphone 10, the audio data acquisition unit 11, the audio data registration unit 12, the evaluation audio data acquisition unit 13, the verification unit 14, the verification result output unit 15, the evaluation unit 20, and the correction unit 21 as functional units. The evaluation unit 20 and the correction unit 21 are built using hardware and/or software, with a CPU serving as a core member, to perform processing related to the determination described above, similarly to the other functional units described in the first embodiment.

The evaluation unit 20 evaluates frequency characteristics of the first microphone 10 and frequency characteristics of the second microphone 2A before speech is input to both of the first microphone 10 and the second microphone 2A. "Before speech is input to both of the first microphone 10 and the second microphone 2A" means before the input of speech to the first microphone 10 and the input of speech to the second microphone 2A are complete.

That is, "before speech is input to both of the first microphone 10 and the second microphone 2A" corresponds to a state in which speech has not been input to both of the first microphone 10 and the second microphone 2A, a state in which speech has only been input to the first microphone 10, and a state in which speech has only been input to the second microphone 2A, and refers to states in which speech has not been input to at least one of the first microphone 10 and the second microphone 2A.

Frequency characteristics are specified in advance for each of the first microphone 10 and the second microphone 2A, and accordingly, the frequency characteristics may be stored in a storage unit (not shown) and acquired by the evaluation unit 20, or the evaluation unit 20 may acquire the frequency characteristics by actually supplying electricity to the first microphone 10 and the second microphone 2A and performing frequency analysis. The evaluation unit 20 calculates a difference between the acquired frequency characteristics of the first microphone 10 and the acquired frequency characteristics of the second microphone 2A.

The correction unit 21 corrects the frequency characteristics of one of the first microphone 10 and the second microphone 2A so as to match the frequency characteristics of the other of the first microphone 10 and the second microphone 2A. As described above, the frequency characteristics of the first microphone 10 and the frequency characteristics of the second microphone 2A are evaluated by the evaluation unit 20. The evaluation is performed by the evaluation unit 20 in a state in which speech has not been input to at least one of the first microphone 10 and the second microphone 2A.

"One of the first microphone 10 and the second microphone 2A" in the state in which speech has not been input corresponds to one of the first microphone 10 and the second microphone 2A in a case where speech has not been input to both of the first microphone 10 and the second microphone 2A, and in a case where speech has not been input to one of the first microphone 10 and the second microphone 2A, corresponds to the one of the first microphone 10 and the second microphone 2A to which speech has not been input.

Also, "the other of the first microphone 10 and the second microphone 2A" in the state in which speech has not been input corresponds to the other of the first microphone 10 and the second microphone 2A in the case where speech has not been input to both of the first microphone 10 and the second microphone 2A, and in the case where speech has not been input to one of the first microphone 10 and the second microphone 2A, corresponds to the other of the first microphone 10 and the second microphone 2A to which speech has been input.

Accordingly, in the case where speech has not been input to both of the first microphone 10 and the second microphone 2A, the correction unit 21 corrects frequency characteristics of one of the first microphone 10 and the second microphone 2A so as to match frequency characteristics of the other of the first microphone 10 and the second microphone 2A, and in the case where speech has not been input to one of the first microphone 10 and the second microphone 2A, the correction unit 21 corrects frequency characteristics of the one of the first microphone 10 and the second microphone 2A to which speech has not been input, so as to match frequency characteristics of the other of the first microphone 10 and the second microphone 2A to which speech has been input.

With this configuration, frequency characteristics of at least one of the first microphone 10 and the second microphone 2A to which speech is input later can be adjusted to match frequency characteristics of the other of the first microphone 10 and the second microphone 2A to which speech has been input, and therefore, it is possible to reduce the number of verification errors caused by a difference between the frequency characteristics of the microphones.

3. Third Embodiment

Next, a third embodiment will be described. The microphone unit 1 according to the third embodiment differs from the microphone unit 1 according to the first embodiment described above in that the microphone unit 1 according to the third embodiment further includes a test audio data acquisition unit 30, a calculation unit 31, and a parameter changing unit 40. Aspects other than the above aspect are the same as those in the first embodiment, and therefore, the following mainly describes differences.

FIG. 3 is a block diagram schematically showing a configuration of the microphone unit 1 according to the present embodiment. As shown in FIG. 3, the microphone unit 1 according to the present embodiment includes the first microphone 10, the audio data acquisition unit 11, the audio data registration unit 12, the evaluation audio data acquisition unit 13, the verification unit 14, the verification result output unit 15, the test audio data acquisition unit 30, the calculation unit 31, and the parameter changing unit 40 as functional units. The test audio data acquisition unit 30, the calculation unit 31, and the parameter changing unit 40 are built using hardware and/or software, with a CPU serving as a core member, to perform processing related to the determination described above, similarly to the other functional units described in the first embodiment.

After verification audio data is registered and before evaluation audio data is acquired from the first microphone 10, the test audio data acquisition unit 30 acquires, as test audio data, speech uttered by the speaker who uttered speech relating to the verification audio data, using the first microphone 10. "After verification audio data is registered" means after verification audio data generated by converting speech that is input to the second microphone 2A is registered in the audio data registration unit 12. "Before evaluation audio data is acquired" means before evaluation audio data generated by converting speech that is input to the first microphone 10 is acquired by the evaluation audio data acquisition unit 13. The "speech uttered by the speaker who uttered speech relating to the verification audio data, using the first microphone 10" is speech that is acquired from the first microphone 10 and uttered by the same speaker as the speaker who uttered speech from which the verification audio data registered in the audio data registration unit 12 has been generated.

Accordingly, during a period from when verification audio data generated by converting speech that is input to the second microphone 2A is registered in the audio data registration unit 12 to when evaluation audio data generated by converting speech that is input to the first microphone 10 is acquired by the evaluation audio data acquisition unit 13, the test audio data acquisition unit 30 acquires, from the first microphone 10, test audio data converted from speech that is input by the same speaker as the speaker who uttered the speech from which the verification audio data registered in the audio data registration unit 12 has been generated.

The calculation unit 31 calculates a verification rate of the speaker that is based on the test audio data while changing a verification parameter that is used in the verification, based on the test audio data and the verification audio data. The calculation unit 31 acquires the test audio data from the test audio data acquisition unit 30 and acquires the verification audio data from the audio data registration unit 12. The parameter used in the verification is a parameter with which at least one of the test audio data and the verification audio data is corrected such that the speaker who uttered speech from which the test audio data has been generated is verified as being the speaker who uttered speech from which the verification audio data has been generated.

In the present embodiment, the verification parameter corresponds to an amplification factor with which at least one of the test audio data and the verification audio data is amplified. For example, at least one of the test audio data in the first microphone 10 and the verification audio data in the second microphone 2A can be amplified such that amplitudes of the test audio data and the verification audio data become equal to each other. An amplification factor that is used at this time corresponds to the verification parameter.

The calculation unit 31 amplifies one or both of the input test audio data and the input verification audio data, while changing the amplification factor successively, and performs calculation to confirm whether or not the speaker who uttered speech from which the test audio data has been generated and the speaker who uttered speech from which the verification audio data has been generated are verified as being the same speaker. The calculation unit 31 stores calculation results obtained as described above.

A verification parameter (amplification factor) that corresponds to the highest verification rate among verification rates that are calculated by the calculation unit 31 is transmitted to the parameter changing unit 40 and is set to at least one of the first microphone 10 and the second microphone 2A. Then, the verification unit 14 performs verification based on the test audio data and the verification audio data to which the verification parameter that corresponds to the highest verification rate among the verification rates calculated by the calculation unit 31 and that is set by the parameter changing unit 40 has been applied. With this configuration, it is possible to reduce the number of verification errors in which the speaker who uttered speech that is based on the evaluation audio data is determined as not being identical with the speaker who uttered speech that is based on the verification audio data, despite the speakers being identical with each other.

In the present embodiment, the parameter changing unit 40 automatically changes a parameter of the first microphone 10 based on the verification parameter when speech that is based on the evaluation audio data is input to the first microphone 10. Therefore, the verification parameter can be easily changed, and verification can be performed using evaluation audio data that can reduce the number of verification errors in which the speaker who uttered speech that is based on the evaluation audio data is determined as not being identical with the speaker who uttered speech that is based on the verification audio data, despite the speakers being identical with each other.

4. Verification Processing

Next, unlocking of a door shown in FIG. 4 will be described as a specific application example of the microphone unit 1. First, a user 100 inputs speech saying a predetermined word to the second microphone 2A that is included in a portable terminal (an example of the device 2) such as a smartphone (#1). If an application has been set up in the smartphone in advance, it is possible to input speech via the smartphone as described above.

The speech input to the second microphone 2A is converted to audio data and transmitted to the microphone unit 1 via a communication function (e.g., wireless communication) of the smartphone. Such conversion to audio data is preferably performed using the application of the smartphone. The audio data acquisition unit 11 of the microphone unit 1 acquires the audio data, and verification audio data that is obtained by extracting feature points from the audio data by the verification audio data generation unit 3A is registered as verification audio data by the audio data registration unit 12 (#2).

In this state, speech is input by the user 100 to the first microphone 10 of the microphone unit 1 (#3). At this time, it is preferable to input the speech saying the predetermined word described above. At this point in time, whether or not the person who has input the speech is the user 100 need not be determined by the microphone unit 1. The input speech is converted to evaluation audio data by the first microphone 10 and acquired by the evaluation audio data acquisition unit 13. The verification unit 14 checks feature points that are extracted from the evaluation audio data against the verification audio data (#5).

When it is determined by the verification unit 14 that the speaker who uttered speech that is based on the evaluation audio data is the speaker who uttered speech that is based on the verification audio data, the verification result output unit 15 outputs, to a lock unit, a signal that indicates that the speakers who uttered the two pieces of speech are identical with each other, i.e., the speaker who uttered speech that is based on the evaluation audio data is the user 100 who uttered speech that is based on the verification audio data. As a result, the door is unlocked (#6).

On the other hand, in the state of #2, speech is input to the first microphone 10 of the microphone unit 1 by a user 150 who is different from the user 100 (#7). At this point in time, whether or not the person who has input the speech is the user 150 need not be determined by the microphone unit 1. The input speech is converted to evaluation audio data by the first microphone 10, and acquired by the evaluation audio data acquisition unit 13. The verification unit 14 checks the evaluation audio data against the verification audio data (#8).

When it is determined by the verification unit 14 that the speaker who uttered speech that is based on the evaluation audio data is not the speaker who uttered speech that is based on the verification audio data, the verification result output unit 15 outputs, to the lock unit, a signal that indicates that the speakers who uttered the two pieces of speech are not identical with each other, i.e., the speaker who uttered speech that is based on the evaluation audio data is not the user 100 who uttered speech that is based on the verification audio data. In this case, the door is not unlocked and kept in the locked state (#9). In this case, a signal indicating that the speaker who uttered speech that is based on the evaluation audio data is not the user 100 who uttered speech that is based on the verification audio data may be output to a notification unit (not shown), and the notification unit may give a notification by outputting sound or light indicating that the speakers are different.

Note that, if the word included in the input speech differs from the word included in speech relating to the verification audio data, it is possible to determine that the user 150 who uttered the input speech is not the user 100.

5. Other Embodiments

In the first embodiment described above, when the verification unit 14 is in the sleep state, the sleep state is ended upon evaluation audio data being acquired by the evaluation audio data acquisition unit 13, but a configuration is also possible in which the verification unit 14 does not enter the sleep state.

In the second embodiment described above, the microphone unit 1 includes the first microphone 10, the audio data acquisition unit 11, the audio data registration unit 12, the evaluation audio data acquisition unit 13, the verification unit 14, the verification result output unit 15, the evaluation unit 20, and the correction unit 21 as the functional units, but the microphone unit 1 may also include the test audio data acquisition unit 30 and the calculation unit 31, and further include the parameter changing unit 40 in addition to the test audio data acquisition unit 30 and the calculation unit 31.

In the third embodiment described above, the microphone unit 1 includes the parameter changing unit 40, but a configuration is also possible in which the microphone unit 1 does not include the parameter changing unit 40.

In the embodiments described above, the microphone unit includes the single first microphone 10, but a configuration is also possible in which the microphone unit includes a plurality of first microphones 10. In such a case, it is preferable to configure each first microphone such that speech is input only from a predetermined direction. With this configuration, only specific speech is recognized, and verification of the speaker can be facilitated.

In the second embodiment described above, frequency characteristics of the first microphone 10 and the second microphone 2A are evaluated, and the correction unit 21 corrects frequency characteristics of one of the first microphone 10 and the second microphone 2A so as to match frequency characteristics of the other of the first microphone 10 and the second microphone 2A. Alternatively, a configuration is also possible in which, first, the user 100 inputs speech to the first microphone 10, and the microphone unit 1 transfers the speech input to the first microphone 10 to the device 2 using wireless communication. Next, the second microphone 2A of the device 2 acquires audio data based on the speech transferred from the microphone unit 1, and the audio data is registered as verification audio data. With this configuration, the verification audio data can be directly generated using speech that has been input to the first microphone 10, and accordingly, the correction for matching frequency characteristics is unnecessary. Also, this configuration can also prevent a verification error caused by a difference between frequency characteristics of the first microphone 10 and the second microphone 2A. Moreover, this configuration is efficient because it is possible to effectively use a function (function of transmitting data to the audio data acquisition unit 11) of the device 2 including the second microphone 2A without providing the first microphone 10 with a function of transmitting data to the audio data acquisition unit 11, and the frequency characteristics need not be corrected in advance.

The above embodiment is described using an example in which the microphone unit 1 is used to unlock a door, but the microphone unit 1 can also be used to lock a door of a vehicle or start a power unit (e.g., an engine or a motor) of a vehicle, or can be used for a device provided in a vehicle (e.g., a handsfree microphone, a speaker microphone combo box, an outer-vehicle speech recognition microphone, or an in-vehicle speech recognition microphone), for example. Also, the microphone unit 1 can be used not only in vehicles but also in a smart speaker, microphones incorporated in household appliances, a monitoring camera, an interphone, household electrical appliances (a television, a refrigerator, a rice cooker, a microwave oven, etc.), a bath remote control, or the like. In other words, it can be said that the microphone unit 1 infers the spoken content of speech input to the first microphone 10, and gives an operation instruction to the device (microphone unit 1) including the first microphone 10, based on the inferred content.

In the embodiments described above, the first microphone 10 and the second microphone 2A are different microphones, but the first microphone 10 and the second microphone 2A may be the same microphone.

In the embodiment described above, "4. Verification Processing" is described as including the following step "a user 100 inputs speech saying a predetermined word to the second microphone 2A that is included in a portable terminal (an example of the device 2) such as a smartphone (#1)", but a configuration is also possible in which the user 100 inputs speech saying a predetermined word to the first microphone 10, and the speech input to the first microphone 10 is transmitted to the second microphone 2A using wireless communication to generate verification audio data. Furthermore, the verification processing is described as including the following step "the verification unit 14 checks feature points that are extracted from the evaluation audio data against the verification audio data (#5)", but a configuration is also possible in which the extraction of the feature points from the evaluation audio data is also performed by the second microphone 2A. In any case, data and feature points can be transmitted using wireless communication.

INDUSTRIAL APPLICABILITY

The present invention is applicable to a microphone unit that is capable of determining whether or not speech that is input to the first microphone is speech uttered by an expected speaker.

DESCRIPTION OF REFERENCE SIGNS

1: microphone unit
2: different device
2A: second microphone
10: first microphone
11: audio data acquisition unit
12: audio data registration unit
13: evaluation audio data acquisition unit
14: verification unit
15: verification result output unit
20: evaluation unit
21: correction unit
30: test audio data acquisition unit
31: calculation unit
40: parameter changing unit

The invention claimed is:

1. A microphone unit capable of determining whether or not speech that is input to a first microphone is speech uttered by an expected speaker, the microphone unit comprising:
an audio data acquisition unit configured to acquire speech as audio data;
an audio data registration unit configured to register verification audio data that is obtained by extracting a feature point from the audio data;
an evaluation audio data acquisition unit configured to acquire speech that is input to the first microphone as evaluation audio data;
a verification unit configured to verify whether or not a speaker who uttered speech that is based on the evaluation audio data is a speaker who uttered speech that is based on the verification audio data, based on the verification audio data and a feature point extracted from the evaluation audio data; and
a verification result output unit configured to output a result of verification performed by the verification unit,
wherein the verification audio data is generated by a device that is different from a device that includes the first microphone, and the verification audio data is transmitted using wireless communication between the device including the first microphone and the different device.

2. The microphone unit according to claim 1,
wherein, when the verification unit is in a sleep state, the sleep state is ended upon the evaluation audio data being acquired by the evaluation audio data acquisition unit.

3. The microphone unit according to claim 2,
wherein the audio data acquired by the audio data acquisition unit is data regarding speech that is input to a second microphone provided in a device that is different from the device including the first microphone, and
the microphone unit further comprises:
an evaluation unit configured to evaluate frequency characteristics of the first microphone and frequency characteristics of the second microphone before speech is input to both of the first microphone and the second microphone; and
a correction unit configured to correct frequency characteristics of one of the first microphone and the second microphone so as to match frequency characteristics of the other of the first microphone and the second microphone.

4. The microphone unit according to claim 3, further comprising:
a test audio data acquisition unit configured to acquire, as test audio data, speech uttered by a speaker who uttered speech relating to the verification audio data using the first microphone, after the verification audio data is registered and before the evaluation audio data is acquired; and
a calculation unit configured to calculate a verification rate of the speaker that is based on the test audio data while changing a verification parameter that is used in the verification, based on the test audio data and the verification audio data,
wherein the verification unit performs the verification based on the verification parameter that corresponds to the highest verification rate among verification rates calculated by the calculation unit.

5. The microphone unit according to claim 4,
wherein the verification parameter is an amplification factor with which at least one of the test audio data and the verification audio data is amplified.

6. The microphone unit according to claim 4, further comprising
a parameter changing unit configured to automatically change a parameter of the first microphone based on the verification parameter when speech that is based on the evaluation audio data is input to the first microphone.

7. The microphone unit according to claim 2, further comprising:
a test audio data acquisition unit configured to acquire, as test audio data, speech uttered by a speaker who uttered speech relating to the verification audio data using the first microphone, after the verification audio data is registered and before the evaluation audio data is acquired; and
a calculation unit configured to calculate a verification rate of the speaker that is based on the test audio data while changing a verification parameter that is used in the verification, based on the test audio data and the verification audio data, wherein the verification unit performs the verification based on the verification parameter that corresponds to the highest verification rate among verification rates calculated by the calculation unit.

8. The microphone unit according to claim 7, wherein the verification parameter is an amplification factor with which at least one of the test audio data and the verification audio data is amplified.

9. The microphone unit according to claim 8, further comprising
a parameter changing unit configured to automatically change a parameter of the first microphone based on the verification parameter when speech that is based on the evaluation audio data is input to the first microphone.

10. The microphone unit according to claim 7, further comprising
a parameter changing unit configured to automatically change a parameter of the first microphone based on the verification parameter when speech that is based on the evaluation audio data is input to the first microphone.

11. The microphone unit according to claim 1, wherein the audio data acquired by the audio data acquisition unit is data regarding speech that is input to a second microphone provided in a device that is different from the device including the first microphone, and the microphone unit further comprises:
an evaluation unit configured to evaluate frequency characteristics of the first microphone and frequency characteristics of the second microphone before speech is input to both of the first microphone and the second microphone; and
a correction unit configured to correct frequency characteristics of one of the first microphone and the second microphone so as to match frequency characteristics of the other of the first microphone and the second microphone.

12. The microphone unit according to claim 11, further comprising:
a test audio data acquisition unit configured to acquire, as test audio data, speech uttered by a speaker who uttered speech relating to the verification audio data using the first microphone, after the verification audio data is registered and before the evaluation audio data is acquired; and
a calculation unit configured to calculate a verification rate of the speaker that is based on the test audio data while changing a verification parameter that is used in the verification, based on the test audio data and the verification audio data,
wherein the verification unit performs the verification based on the verification parameter that corresponds to the highest verification rate among verification rates calculated by the calculation unit.

13. The microphone unit according to claim 12, wherein the verification parameter is an amplification factor with which at least one of the test audio data and the verification audio data is amplified.

14. The microphone unit according to claim 12, further comprising
a parameter changing unit configured to automatically change a parameter of the first microphone based on the verification parameter when speech that is based on the evaluation audio data is input to the first microphone.

15. The microphone unit according to claim 1, further comprising:
a test audio data acquisition unit configured to acquire, as test audio data, speech uttered by a speaker who uttered speech relating to the verification audio data using the first microphone, after the verification audio data is registered and before the evaluation audio data is acquired; and
a calculation unit configured to calculate a verification rate of the speaker that is based on the test audio data while changing a verification parameter that is used in the verification, based on the test audio data and the verification audio data,
wherein the verification unit performs the verification based on the verification parameter that corresponds to the highest verification rate among verification rates calculated by the calculation unit.

16. The microphone unit according to claim 15, wherein the verification parameter is an amplification factor with which at least one of the test audio data and the verification audio data is amplified.

17. The microphone unit according to claim 16, further comprising
a parameter changing unit configured to automatically change a parameter of the first microphone based on the verification parameter when speech that is based on the evaluation audio data is input to the first microphone.

18. The microphone unit according to claim 15, further comprising
a parameter changing unit configured to automatically change a parameter of the first microphone based on the verification parameter when speech that is based on the evaluation audio data is input to the first microphone.

19. The microphone unit according to claim 1, wherein the microphone unit identifies a speaker who uttered the speech input to the first microphone, based on the result of verification performed by the verification unit.

20. The microphone unit according to claim 1, wherein the microphone unit infers spoken content of the speech input to the first microphone, and gives an operation instruction to the device including the first microphone, based on the inferred content.

* * * * *